United States Patent

Strasser et al.

Patent Number: 6,068,942
Date of Patent: May 30, 2000

[54] PROCESS FOR OPERATING A PEM FUEL CELL INSTALLATION

[75] Inventors: Karl Strasser; Willi Bette; Regina Hornung, all of Erlangen, Germany

[73] Assignee: Siemens Aktiengesellschaft, Munich, Germany

[21] Appl. No.: 09/208,368

[22] Filed: Dec. 10, 1998

Related U.S. Application Data

[63] Continuation of application No. PCT/DE97/01077, May 28, 1997.

[30] Foreign Application Priority Data

Jun. 10, 1996 [DE] Germany ............ 196 23 076

[51] Int. Cl.$^7$ ............................ H01M 8/04
[52] U.S. Cl. ............................ 429/13; 429/25
[58] Field of Search .................... 429/13, 25, 33

[56] References Cited

U.S. PATENT DOCUMENTS

| | | | |
|---|---|---|---|
| 3,525,642 | 8/1970 | Ross | 429/25 |
| 4,226,919 | 10/1980 | Stüwe | 429/25 |
| 4,904,547 | 2/1990 | Mizumoto et al. | 429/25 X |
| 5,700,595 | 12/1997 | Reiser | 429/25 X |

FOREIGN PATENT DOCUMENTS

| | | |
|---|---|---|
| 0 149 478 A2 | 7/1985 | European Pat. Off. . |
| 28 36 464 | 2/1980 | Germany . |
| 42 01 795 A1 | 7/1993 | Germany . |

OTHER PUBLICATIONS

Patent Abstracts of Japan No. 06–333586 (Osamu et al.), dated Dec. 2, 1994.
Patent Abstracts of Japan No. 03–194863 (Kenro et al.), dated Aug. 26, 1991.
Patent Abstracts of Japan No. 01–200567 (Toshiaki), dated Aug. 11, 1989.
Patent Abstracts of Japan No. 07–272738 (Nariyuki), dated Oct. 20, 1995.
Patent Abstracts of Japan No. 03–081970 (Akitoshi et al.), dated Apr. 8, 1991.
Patent Abstracts of Japan No. 02–033866 (Hiroshi), dated Feb. 5, 1990.
Patent Abstracts of Japan No. 07–249424 (Katsunori et al.), dated Sep. 26, 1995.

*Primary Examiner*—Stephen Kalafut
*Attorney, Agent, or Firm*—Herbert L. Lerner; Laurence A. Greenberg; Werner H. Stemer

[57] ABSTRACT

A process for operating a PEM fuel cell installation includes providing at least one PEM fuel cell module having an inlet valve for hydrogen $H_2$ and an inlet valve for oxygen $O_2$. In order to switch off the PEM fuel cell module, the oxygen $O_2$ inlet valve is closed in a first step, and the hydrogen $H_2$ inlet valve is closed in a second step when a predetermined oxygen $O_2$ partial pressure at a cathode part of the PEM fuel cell module is reached. Reliable operation of the PEM fuel cell installation is guaranteed by this measure.

4 Claims, 2 Drawing Sheets

PROCESS FOR OPERATING A PEM FUEL CELL INSTALLATION

CROSS-REFERENCE TO RELATED APPLICATION

This application is a continuation of copending International Application No. PCT/DE97/01077, filed May 28, 1997, which designated the United States.

BACKGROUND OF THE INVENTION

Field of the Invention

The invention relates to a process for operating a PEM fuel cell installation.

It is known that, during the electrolysis of water, water molecules are decomposed by electric current into hydrogen ($H_2$) and oxygen ($O_2$). In a fuel cell, that process takes place in reverse. Electric current is produced with high efficiency through an electrochemical combination of hydrogen ($H_2$) and oxygen ($O_2$) to form water. If pure hydrogen ($H_2$) is used as combustion gas, it takes place without the emission of pollutants and carbon dioxide ($CO_2$). Even with a technical combustion gas, for example natural gas or coal gas, and with air (which may additionally be enriched with oxygen ($O_2$)) instead of pure oxygen ($O_2$), a fuel cell produces considerably less pollutants and less carbon dioxide ($CO_2$) than other forms of energy production which operate by using fossil energy sources. The technical implementation of the fuel cell principle has given rise to a wide variety of solutions, and more precisely with different electrolytes and with operating temperatures of between 80° C. and 1000° C.

The fuel cells are classified as low, medium and high temperature fuel cells according to their operating temperature, and they in turn differ for a variety of technical embodiments.

Besides the aforementioned fundamental advantages, a fuel cell with a plastic solid electrolyte (polymer electrolyte membrane or PEM) offers further positive properties such as low operating temperature (<80° C.), favorable response to overloading, little voltage degradation and long life span, favorable response to loading cycles and temperature cycles, and the absence of a corrosive liquid electrolyte. It is furthermore suitable for operation with ambient air instead of oxygen ($O_2$). Together, those properties make an air-operated PEM fuel cell a virtually ideal producer of energy, for example for electrically powering a motor vehicle without producing exhaust gases.

A PEM fuel cell block (the fuel cell block is also referred to as a "stack" in the specialist literature) is generally composed of a large number of PEM fuel cells which have a planar structure and are stacked together. Since the PEM fuel cell block is not operable on its own, the PEM fuel cell block, an operating part and associated module electronics are generally combined to form a PEM fuel cell module. The devices for supplying working media, for example hydrogen ($H_2$) and oxygen ($O_2$) or air, for discharging the water which is produced, for dissipating heat losses, for wetting the working media and for separating gas impurities, are combined in the operating part.

If the anode and the cathode of the PEM fuel cell are supplied with their working media, then a cell voltage is created from the sum of the anode and cathode potentials, which has a specific characteristic depending on the load current. In order to ensure an orderly build-up of all of the cell voltages in the PEM fuel cell block when switching on, the supplying of the anodes and cathodes with their working media must be established through a defined switch-on phase, so as to make it possible to obtain a delay-free changeover from the switch-on phase to a phase for producing electrical energy, in other words, a load phase. When switching off, the supplying of the PEM fuel cell block with the working media is suspended, and the residual capacity in the gas spaces of the anodes and cathodes is taken down by loading, so long as the voltage of the PEM fuel cell block remains greater than 0 V.

In one process for switching off a PEM fuel cell module, which is known from the prior art, a hydrogen inlet valve is closed in a first step and an oxygen inlet valve is closed in a second step, according to the hydrogen partial pressure at an anode part. That process leads to an increase in the internal resistance of the PEM fuel cells and poisoning of the electrolyte membrane, which is equivalent to a power loss and causes premature failure of the PEM fuel cell module.

SUMMARY OF THE INVENTION

It is accordingly an object of the invention to provide a process for operating a PEM fuel cell installation, which overcomes the hereinafore-mentioned disadvantages of the heretofore-known processes of this general type and which avoids such premature fuel-cell aging as far as possible.

The basis of the invention is that, if the voltage of the PEM fuel cell block is 0 V, this only means that the sum of all of the cell voltages is 0 V. Very different cell voltage profiles may arise during switch-off and in the following off phase, depending on how the individual PEM fuel cells in the PEM fuel cell block are connected in terms of the flow of working media, and depending on what load is set in the switch-off phase.

These cell voltage profiles firstly indicate non-uniform supplying of the anodes and cathodes with working media during the switch-off phase. As a result of subsequent diffusion of the working media through the electrolyte membranes, only that working medium which is present in excess remains, since both the anode and the cathode work unselectively.

The gas fillings at the anodes and at the cathodes are of approximately the same size for structural reasons. If, for example, hydrogen ($H_2$) and oxygen ($O_2$) are used as working media, then twice as much oxygen ($O_2$) as oxygen ($O_2$) is consumed during the electrochemical reaction in the PEM fuel cells. If the supply of hydrogen and the supply of oxygen are then suspended simultaneously, or else the supply of hydrogen is suspended before the supply of oxygen, oxygen ($O_2$) will be present in excess in the PEM fuel cell block.

That residual oxygen ($O_2$) in the PEM fuel cell block sets processes in motion at the components of the PEM fuel cells which cause a reduction in the cell voltage and therefore also in the efficiency. Irreproducibly created oxide layers change the internal cell resistance and therefore the current density distribution. In that case, corrosive processes may also occur, which poison the electrolyte membrane and thereby shorten the life span of the PEM fuel cell block. Both the increase in the internal cell resistance and the corrosion on the components cause a reduction in the cell voltage.

With the foregoing and other objects in view there is provided, in accordance with the invention, a process for operating a PEM fuel cell installation, which comprises providing at least one or each PEM fuel cell module with a device for adjusting a supply of hydrogen and a supply of oxygen; and suspending the supply of working media (hydrogen $H_2$ and oxygen $O_2$ in this case) by suspending the supply of oxygen in a first step and suspending the supply of hydrogen in a second step.

By virtue of this process, the fuel cell is preserved in a condition which guarantees reliable operation of the PEM fuel cell installation over relatively long periods of service. During suspension, potentials at the electrodes of the PEM fuel cells, which could cause corrosive processes at the components of the PEM fuel cells, are avoided. A voltage loss due to an increased internal resistance of the PEM fuel cell and a reduction in the life span of the PEM fuel cell module are thereby avoided. Sufficient stability of the cell voltages is furthermore achieved.

In accordance with another mode of the invention, in the second step, the supply of hydrogen is suspended when a predetermined oxygen partial pressure at a cathode part of the PEM fuel cell module is reached.

In accordance with a further mode of the invention, a predetermined value of about 0.5 bar for the oxygen $O_2$ partial pressure has proved suitable.

In accordance with an added mode of the invention, the oxygen ($O_2$) may be supplied in the form of compressed air. When operating with air, an air compressor may be used to take in air from the surroundings and feed it into the PEM fuel cell module. In the first step, it is then merely necessary to switch off this compressor.

In accordance with a concomitant mode of the invention, the oxygen partial pressure is measured indirectly through the static air pressure.

Other features which are considered as characteristic for the invention are set forth in the appended claims.

Although the invention is illustrated and described herein as embodied in a process for operating a PEM fuel cell installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
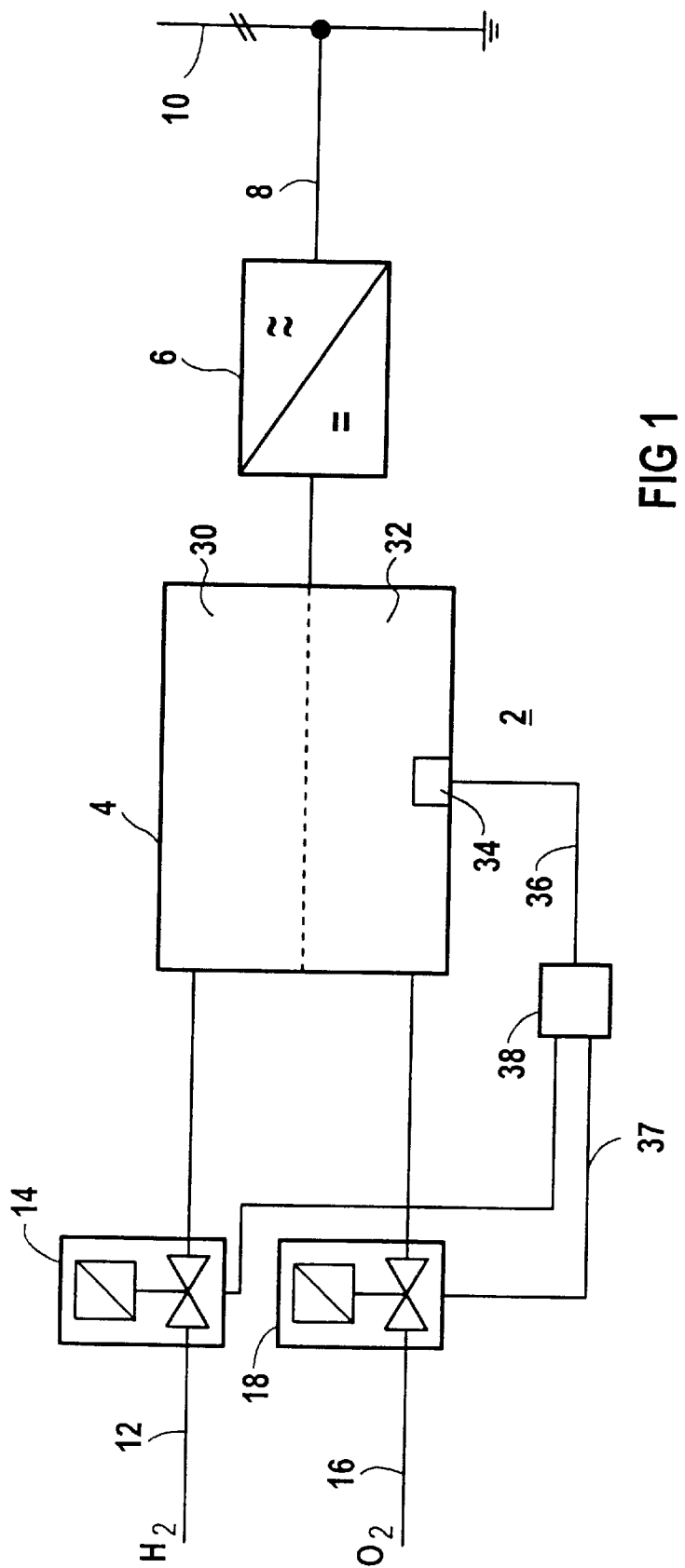
FIG. 1 is a schematic and diagrammatic view of a PEM fuel cell installation.

Referring now to the figures of the drawings in detail and first, particularly, to FIG. 1 thereof, there is seen a PEM fuel cell installation 2 which includes a PEM fuel cell module 4 with an anode part 30 and a cathode part 32. The PEM fuel cell module 4 is composed of a large number of PEM fuel cells, such as, for example, those known from a report entitled "Brennstoffzellen für Elektrotraktion" [Fuel Cells for Electrical Traction], by K.Straßer, in VDI Report No. 912, 1992, pages 125 to 145. A direct current produced during normal operation in the PEM fuel cell module 4 is converted into alternating current in an inverter 6 and fed through a line 8, for example to an electrical network 10.

Hydrogen $H_2$ is fed as working medium to the anode part 30 of the PEM fuel cell module 4 through a feed 12. A device 14 for adjusting a supply is connected upstream of the PEM fuel cell module 4 in the feed 12. In this case, the device 14 is in the form of a hydrogen inlet valve. In a further non-illustrated illustrative embodiment the device 14 is in the form of a compressor. Oxygen $O_2$ is fed through a feed 16 as working medium to the cathode part 32 of the PEM fuel cell module 4 for an electrochemical reaction. A device 18 for adjusting the supply of oxygen $O_2$ to the PEM fuel cell module 4 is connected upstream in the feed 16. In this case, the device 18 is in the form of an oxygen inlet valve.

During operation of the PEM fuel cell installation 2, in order to suspend the supply of working media (in this case of oxygen $O_2$ and hydrogen $H_2$) to the PEM fuel cell module 4, the oxygen inlet valve 18 is closed in a first step and the hydrogen inlet valve 14 is closed in a second step. After the oxygen inlet valve 18 has been closed, hydrogen $H_2$ continues to flow through the anode part 30 of the PEM fuel cell module 4. In this process, residual oxygen $O_2$ still remaining in the cathode part 32 is therefore consumed to produce electrical energy during the suspension of the supply of working media. By virtue of this method, both the life span of the PEM fuel cells is considerably lengthened and sufficient stability of the cell voltage is achieved.

Preferably, the hydrogen inlet valve 14 is closed in the second step when a predetermined oxygen $O_2$ partial pressure at the cathode part 32 is reached. In practice, a predetermined value of approximately 0.5 bar for the oxygen partial pressure has proved suitable in this regard.

The oxygen partial pressure does not have to be measured directly in this case. Thus, under certain circumstances, it is possible to conclude that the oxygen has been substantially depleted from a dip in the electrical voltage. In particular, the oxygen partial pressure may be measured indirectly through the static air pressure. A pressure sensor 34 is provided in the cathode part 32 of the PEM fuel cell module 4 for measuring the static air pressure. The pressure sensor 34 is connected through an electrical line 36 to the hydrogen inlet valve 14. A control unit 38 for closing and opening the hydrogen inlet valve 14 is connected into the electrical line 34. The control unit 38 opens or closes the oxygen inlet valve 18 through an electrical line 37. During the process, values for the static air pressure from the pressure sensor 34 are continuously applied to the control unit 38. If the value of the oxygen partial pressure, which is calculated in the control unit 38 from the measured static air pressure, decreases below a predetermined value for the oxygen partial pressure, then the hydrogen inlet valve 14 is closed by the control unit 38.

However, the oxygen $O_2$ partial pressure may also be measured indirectly through the voltage of the PEM fuel cell module 4.

Figure 2:
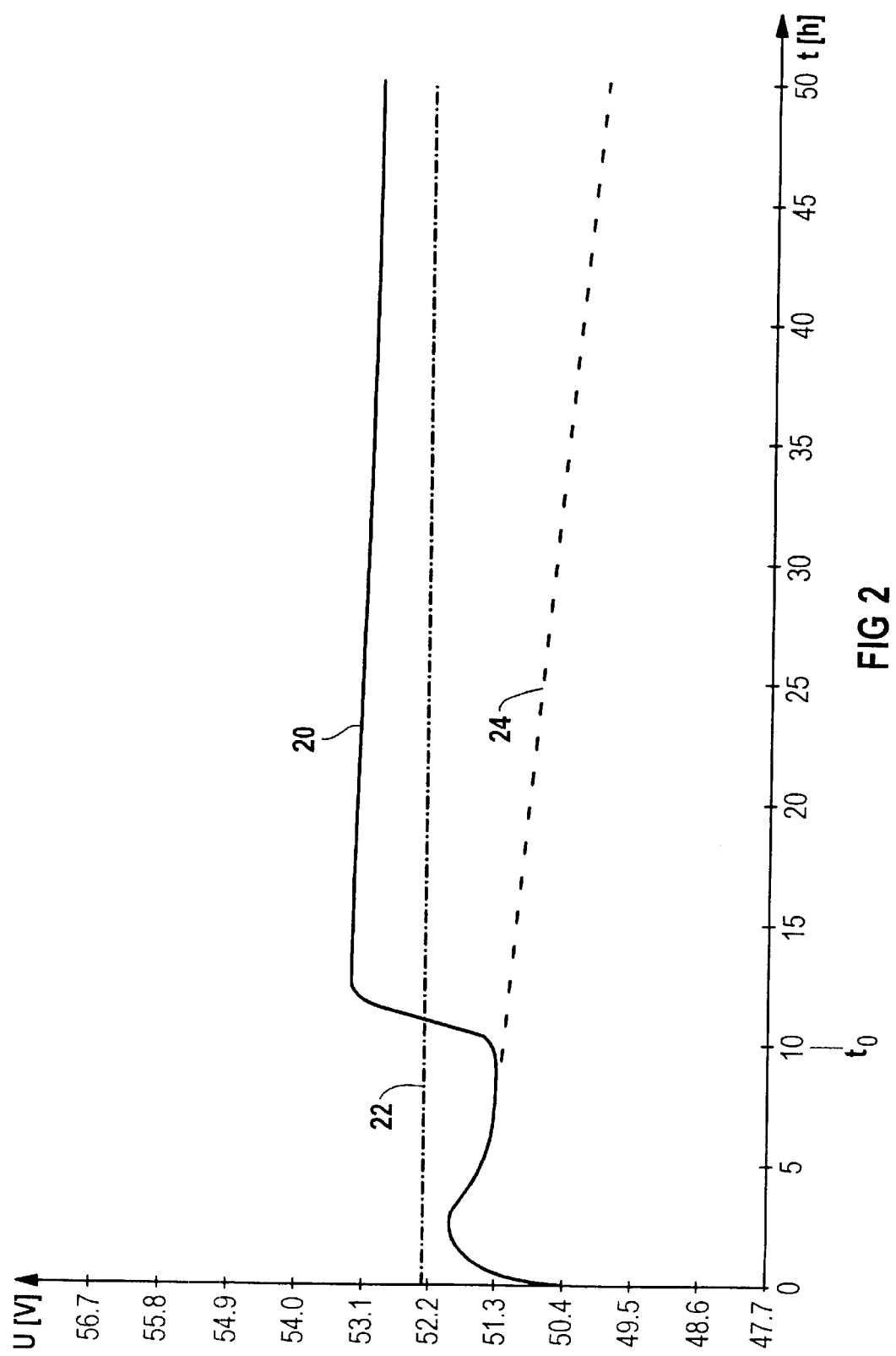
FIG. 2 is a diagram in which a voltage of the PEM fuel cell module is plotted against its operating time.

The diagram in FIG. 2 shows a profile of a voltage U of the PEM fuel cell module 4 during conditioning, provided for a power of between 30 and 50 kW with an electrical current of 650 A, as a function of an operating time t. During the conditioning (as a preparatory test run for the actual use) the PEM fuel cell module 4 is switched off in each case after one half hour of normal operation and switched on again (intermittent operation). Put another way, the normal operation is interrupted by suspending the supply of working media. In this case, the voltage U decreases each time the PEM fuel cell module 4 is switched off to 0 V within about 15 seconds.

The way in which the curve is obtained, is that after a starting phase in which the normal operating state is set, the voltage values which in each case result at the start of a switch-off process during this intermittent operation are respectively compared with one another. A solid curve 20 shows the voltage U (in volts) of the PEM fuel cell module 4 which in this case contains 72 fuel cells. A line of dots and dashes at a voltage U of about 52.2 V is indicated as a reference line 22.

In a subregion of the solid curve 20 for an operating time t of between 0 and 10 hours, the measured values of the voltage U are plotted for the process known from the prior art. In that case, the hydrogen inlet valve 14 is closed in a first step and the oxygen inlet valve 18 is closed in a second step. The measured values plotted for the voltage U are significantly below the reference line 22.

Continuing to use the process known from the prior art in the operating time t between 10 and 50 hours (i.e. starting at t0) would result in values for the voltage U which correspond to the dashed line 24. The dashed line 24 exhibits a significant drop in the operating time t between 10 and 50 hours, which corresponds to a reduction in the voltage U from about 51.3 to approximately 50 V.

A second part (i.e. starting at t0) of the solid curve 20 corresponds to the measured values of the voltage U using the process according to the invention, i.e. the oxygen inlet valve 18 is closed in the first step and the hydrogen inlet valve 14 of the PEM fuel cell module 4 is closed in the second step. This second part of the solid curve 20 runs almost continuously at a voltage U of close to 53 V. It runs significantly above the reference line 22, which it only reaches asymptotically, that is to say after long periods of operation.

It can be seen from the diagram that, when the claimed process is employed to suspend the supply of working media for the PEM fuel cell module 4, its life span is substantially longer than when the process known from the prior art is employed. When using the process according to the invention for suspending the supply of working media, not only is the life span of the PEM fuel cells extended considerably, but sufficient stability of the voltage U of the PEM fuel cell module is also achieved, which is reflected by an approximately constant voltage U.

We claim:

1. A process for operating a PEM fuel cell installation, which comprises: providing at least one PEM fuel cell module with a device for adjusting a supply of hydrogen and a supply of oxygen; and suspending the supply of hydrogen and the supply of oxygen by suspending the supply of oxygen in a first step and suspending the supply of hydrogen in a second step when an oxygen partial pressure of about 0.5 bar at a cathode part of the PEM fuel cell module is reached.

2. The process according to claim 1, which comprises measuring the oxygen partial pressure indirectly through static air pressure.

3. A process for operating a PEM fuel cell installation, which comprises:

providing at least one PEM fuel cell module with a device for adjusting a supply of hydrogen and a supply of oxygen; and suspending the supply of hydrogen and the supply of oxygen by suspending the supply of oxygen in a first step and suspending the supply of hydrogen in a second step when a predetermined oxygen partial pressure at a cathode part of the PEM fuel cell module is reached;

measuring a further oxygen partial pressure indirectly through static air pressure.

4. A process for operating a PEM fuel cell installation, which comprises:

providing at least one PEM fuel cell module with a device for adjusting a supply of hydrogen and a supply of oxygen; and suspending the supply of hydrogen and the supply of oxygen by suspending the supply of oxygen in a first step and suspending the supply of hydrogen in a second step;

supplying the oxygen in the form of compressed air;

measuring an oxygen partial pressure indirectly through static air pressure.

* * * * *